Patented Sept. 1, 1925.

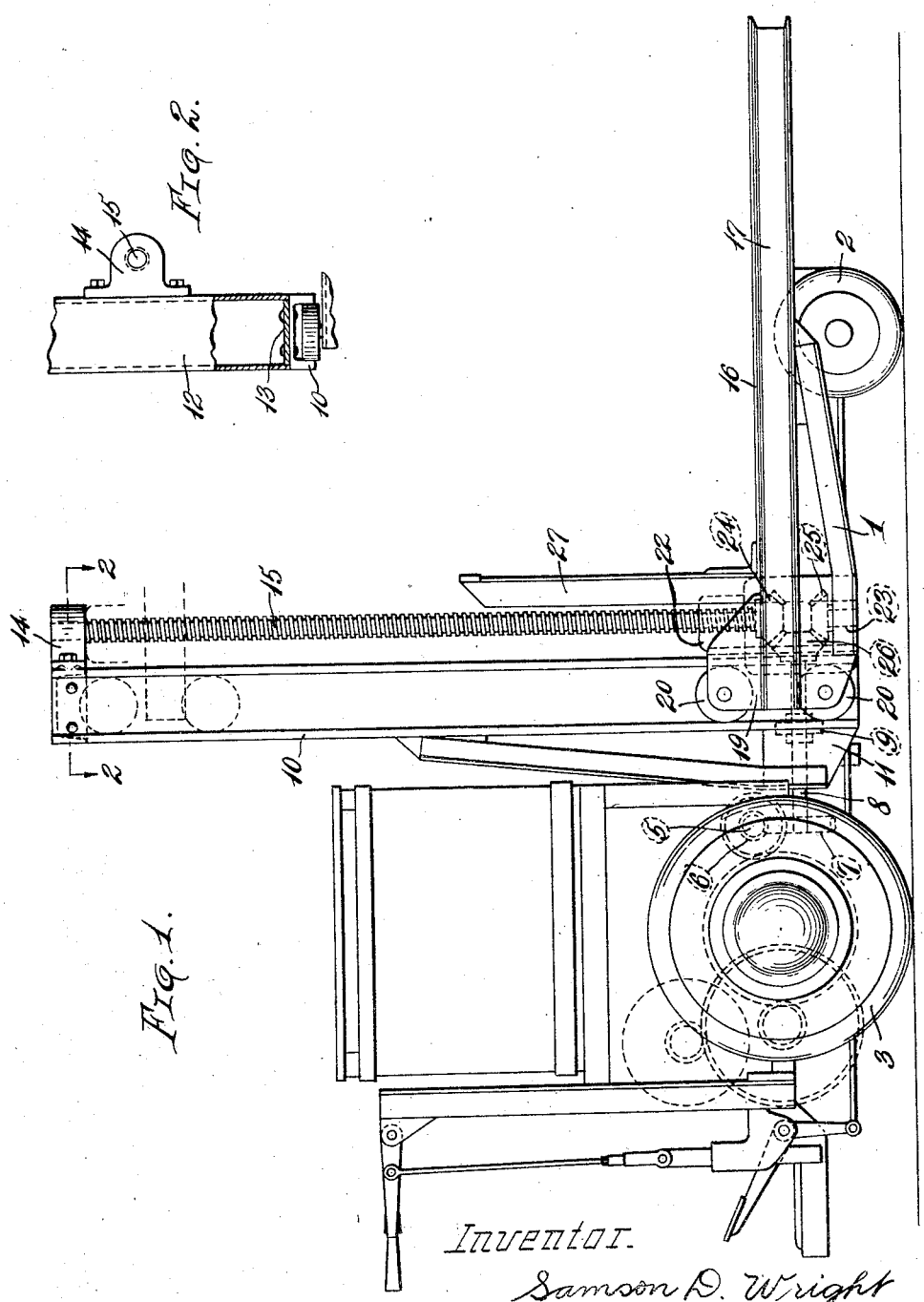

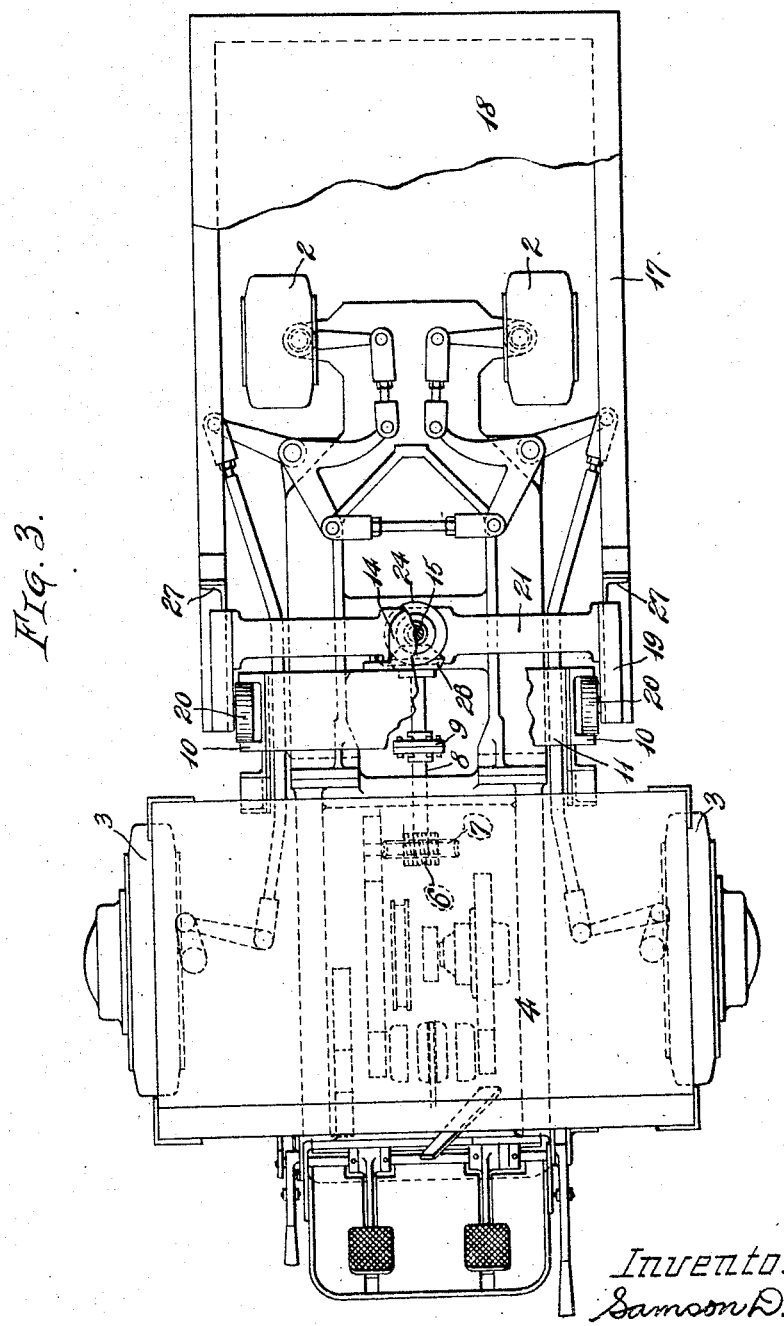

1,551,600

UNITED STATES PATENT OFFICE.

SAMSON D. WRIGHT, OF CLEVELAND HEIGHTS, OHIO.

TRUCK.

Application filed April 5, 1920. Serial No. 371,297.

*To all whom it may concern:*

Be it known that I, SAMSON D. WRIGHT, a citizen of the United States, residing at Cleveland Heights, in the county of Cuyahoga and State of Ohio, have invented certain new and useful Improvements in Trucks, of which the following is a specification.

This invention relates to trucks of the small type, such as are used in factories and manufacturing plants for moving loads from place to place.

The object of the invention is to provide an improved truck embodying a load receiving or carrying platform which is movable vertically on the truck chassis frame so that loads can be received or discharged at different levels or the truck can be used either as an elevator for raising or lowering material any distance within reason or for taking on a load at one level and discharging it at another. A further object of the invention is to simplify and improve the operating mechanism for the truck platform.

In the drawings, which represent one suitable embodiment of the invention, Fig. 1 is a side elevation; Fig. 2 is a detail plan view, partly broken away and in section on the line 2—2, Fig. 1; and Fig. 3 is a plan view.

The truck shown in the drawings comprises a suitable relatively stationary chassis or frame 1 supported by the idle wheels 2 and traction wheels 3, either or both pairs of which may be turned for the steering movement. So far as the chassis, wheel and driving mechanism are concerned, the truck may be of any suitable form, and is illustrated as of practically the same construction shown in a prior patent for truck No. 1,313,151, granted August 12, 1919, on an application filed by S. D. Wright, E. W. Schellentrager, and C. C. Martin, to which reference may be had for a more complete description of the wheel and driving mechanism. Said mechanism, illustrated generally at 4, includes driving connections from a motor to a shaft 5 having a worm 6 for driving a worm wheel 7 upon a longitudinally extending shaft 8 having the universal coupling 9 therein.

The stationary chassis or truck frame is provided with a platform supporting frame, which comprises side channel members 10, the flanges of which extend outwardly, and which channels are attached at their lower ends to pads 11 carried by the stationary frame and are connected at their upper ends by a cross channel 12 whose flanges extend downwardly. Channels 10 and 12 may be connected and re-inforced by angle members 13. The upper cross bar 12 has a bracket 14 secured thereto which serves as a bearing for the upper end of a screw shaft 15.

16 represents the vertically movable platform or load carrying deck, which may be built of side and end members 17 of channel or other suitable cross section and to which may be secured a sheet metal or other floor 18. At one end this platform is provided with two longitudinally extending frame members 19, one on either side of the truck, in which are journaled rollers 20 traveling in the grooves or recesses between the outwardly extending flanges of the vertical channels 10. Frame members 19 are connected by a cross bar 21 which carries a nut 22 threaded upon the screw shaft 15. Said screw shaft is journaled at its lower end in a bearing 23 carried by the stationary chassis and is provided with two bevel gears, one of which, 24, is keyed to rotate with the screw shaft, while the other, 25, rotates loosely thereon and serves to increase the bearing for the screw shaft. Both of said gears 24, 25, mesh with a bevel gear 26 on the shaft 8.

The driving motor which turns the shaft 5, as stated in my prior patent, may be an electric motor, and by reversal of said motor, shaft 5 may be turned in either direction and the direction of rotation of the screw shaft 15 reversed when desired. Nut 22 may therefore be caused to travel up and down along the screw shaft, thereby causing the frames 19 and the rollers 20 to travel vertically in the side channel members of the stationary frame and elevate or lower the platform 16 to any desired position. The truck may be used with the platform lying at any level, and at any time, whether empty or loaded, said platform may be shifted to any level to meet with special conditions. This arrangement enables the platform or desk to have vertical movement through any desired distance within reason, say several feet, as distinguished from prior constructions as in the patent referred to, where the amount of motion is limited to a relatively small amount.

Preferably the platform is provided adjacent the screw 15 with one or more upwardly extending guard members 27, which prevent the load applied to the platform from touching or injuring the screw shaft or other mechanism.

What I claim is:

1. A truck, comprising a main frame, supporting wheels therefor, a vertically movable platform, supporting means for said platform including a pair of oppositely disposed channel members with their flanges extending outwardly from the frame, said platform being provided with arms extending outside of said vertical channel members and carrying rollers travelling between the flanges thereof, and means for elevating said platform comprising a rotatable screw, and a nut member on the platform.

2. A truck, comprising a main frame, supporting wheels therefor, a vertically movable platform, supporting means for said platform including oppositely disposed channel members, said platform being provided with rollers traveling between the flanges of said channel members, means for elevating said platform comprising a rotatable screw and a nut member on the platform, said screw being located outside of the transverse plane through said rollers and substantially equidistant from said channel members.

3. A track, comprising a main frame, supporting wheels therefor, a vertically movable platform, supporting means for said platform including oppositely disposed channel members with their flanges extending outwardly from the frame, said platform being provided with a cross bar outside of the transverse plane through said rollers, side arms extending from said cross bar to the outerside of said channel members and carrying rollers traveling between the flanges thereof, and means for elevating said platform comprising a nut member on said cross bar approximately midway thereof and a screw for said nut.

In testimony whereof I affix my signature.

SAMSON D. WRIGHT.